US012811214B2

(12) United States Patent
Bannai

(10) Patent No.: US 12,811,214 B2
(45) Date of Patent: Nov. 24, 2026

(54) BATTERY PACK

(71) Applicant: MURATA MANUFACTURING CO., LTD., Kyoto (JP)

(72) Inventor: Yoshiyuki Bannai, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 471 days.

(21) Appl. No.: 18/538,017

(22) Filed: Dec. 13, 2023

(65) Prior Publication Data

US 2024/0120570 A1 Apr. 11, 2024

Related U.S. Application Data

(63) Continuation of application No. PCT/JP2022/024709, filed on Jun. 21, 2022.

(30) Foreign Application Priority Data

Sep. 17, 2021 (JP) ................................ 2021-151824

(51) Int. Cl.

| | |
|---|---|
| ***H01M 10/653*** | (2014.01) |
| ***H01M 10/613*** | (2014.01) |
| ***H01M 10/643*** | (2014.01) |
| ***H01M 10/659*** | (2014.01) |
| ***H01M 50/213*** | (2021.01) |

(Continued)

(52) U.S. Cl.

CPC ....... *H01M 10/653* (2015.04); *H01M 10/613* (2015.04); *H01M 10/643* (2015.04); *H01M 10/659* (2015.04); *H01M 50/213* (2021.01); *H01M 50/291* (2021.01); *H01M 50/293* (2021.01); *H01M 50/383* (2021.01)

(58) Field of Classification Search

None

See application file for complete search history.

(56) References Cited

U.S. PATENT DOCUMENTS

2011/0274951 A1 11/2011 Yasui et al.
2013/0316203 A1* 11/2013 Hsiao ................ H01M 10/6556 429/83

(Continued)

FOREIGN PATENT DOCUMENTS

CN 110994067 A * 4/2020 ........ H01M 10/6556
CN 212700167 U 3/2021

(Continued)

OTHER PUBLICATIONS

Machine Translation of CN-110994067A. (Year: 2020).*
International Search Report of corresponding PCT application PCT/JP2022/024709, dated Aug. 2, 2022.

*Primary Examiner* — Gregg Cantelmo
(74) *Attorney, Agent, or Firm* — K&L Gates LLP

(57) ABSTRACT

A battery pack includes a plurality of batteries, an isolating member that is arranged between the plurality of batteries and isolates the plurality of batteries from each other, and a heat absorbing agent that is housed inside the isolating member. The isolating member has a first housing space for housing the heat absorbing agent, and contains an amorphous engineering plastic. In addition, the isolating member has a first thin portion having a locally thin wall thickness in at least a part of a region where the first housing space faces each of the plurality of batteries.

14 Claims, 7 Drawing Sheets

(51) Int. Cl.

| | |
|---|---|
| ***H01M 50/291*** | (2021.01) |
| ***H01M 50/293*** | (2021.01) |
| ***H01M 50/383*** | (2021.01) |

(56) References Cited

U.S. PATENT DOCUMENTS

| | | | | |
|---|---|---|---|---|
| 2015/0155534 | A1 | 6/2015 | Tsutsui et al. | |
| 2015/0214584 | A1* | 7/2015 | Droste ................ | H01M 50/264 429/100 |

FOREIGN PATENT DOCUMENTS

| | | | |
|---|---|---|---|
| JP | 2010-287492 | A | 12/2010 |
| JP | 2012-252959 | A | 12/2012 |
| JP | 2014-049226 | A | 3/2014 |
| JP | 2020-087841 | A | 6/2020 |
| JP | 2020-140929 | A | 9/2020 |
| WO | 2010098067 | A1 | 9/2010 |

* cited by examiner

BATTERY PACK

CROSS REFERENCE TO RELATED APPLICATIONS

The present application is a continuation of PCT patent application no. PCT/JP2022/024709, filed on Jun. 21, 2022, which claims priority to Japanese patent application no. 2021-151824, filed on Sep. 17, 2021, the entire contents of which are incorporated herein by reference.

BACKGROUND

The present technology relates to a battery pack.

Since electronic equipment has been widely spread, a battery has been developed as a power supply applied to the electronic equipment. In this case, in order to handle a plurality of batteries easily and safely, a battery pack including the plurality of batteries has been developed.

Various studies have been made on the configuration of the battery pack. Specifically, a heat absorbing member is in contact with a side surface of the battery unit, and in the heat absorbing member, a heat absorbing agent (in a liquid state or a gel state) is enclosed inside an exterior film. A plurality of battery cells are partitioned by a partition wall having a heat absorbing chamber inside, a refrigerant is sealed inside the heat absorbing chamber, and the heat absorbing chamber is deformable according to thermal expansion of the battery cells.

SUMMARY

The present technology relates to a battery pack.

Various studies on the configuration of the battery pack have been made, but the safety of the battery pack is still insufficient, and therefore there is room for improvement.

Therefore, a battery pack capable of obtaining excellent safety is desired.

A battery pack according to an embodiment of the present technology includes a plurality of batteries, an isolating member arranged between the plurality of batteries and isolating the plurality of batteries from each other, and a heat absorbing agent housed inside the isolating member. The isolating member has a first housing space for housing the heat absorbing agent, and contains an amorphous engineering plastic. In addition, the isolating member has a first thin portion having a locally thin wall thickness in at least a part of a region where the first housing space faces each of the plurality of batteries.

Another battery pack according to an embodiment of the present technology includes a plurality of batteries, an isolating member arranged between the plurality of batteries and isolating the plurality of batteries from each other, and a heat absorbing agent housed inside the isolating member. The isolating member has a melting portion in at least a part of a region where the batteries and the heat absorbing agent face each other. When the batteries generate heat or ignite, the isolating member locally melts in the melting portion to release the heat absorbing agent toward the batteries.

According to the battery pack according to an embodiment of the present technology, the isolating member containing an amorphous engineering plastic isolates the plurality of batteries from each other, the heat absorbing agent is housed inside the isolating member (first housing space), and the isolating member has the first thin portion in at least a part of the region where the first housing space faces each of the plurality of batteries, and thus excellent safety can be obtained.

According to a battery pack of an embodiment of the present technology, the isolating member isolates the plurality of batteries from each other, the heat absorbing agent is housed inside the isolating member, the isolating member has the melting portion, and the isolating member locally melts, when the batteries generate heat or ignite, in the melting portion to release the heat absorbing agent toward the batteries, and thus excellent safety can be obtained.

The effect of the present technology is not necessarily limited to the effect described herein, and may be any effect of a series of effects relating to the present technology.

DETAILED DESCRIPTION

The present technology will be described below in further detail including referring to the accompanying drawings.

First, a battery pack according to an embodiment of the present technology is described.

The battery pack described herein is a power supply including a plurality of batteries, and is applied to various applications such as electronic devices. Details of the application of the battery pack will be described later.

The kind of the battery is not particularly limited, and may be a primary battery or a secondary battery. The kind of the secondary battery is not particularly limited, and is specifically a lithium ion secondary battery or the like in which a battery capacity is obtained using occlusion and release of lithium ions. The number of batteries is not particularly limited, and thus can be arbitrarily set.

Hereinafter, a case where the battery is a secondary battery (lithium ion secondary battery) will be described. That is, the battery pack described below is a power supply including a plurality of lithium ion secondary batteries.

Figure 1:
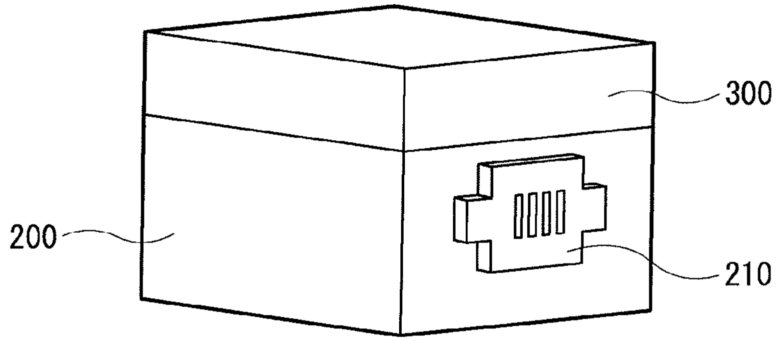
FIG. 1 is a perspective view illustrating a configuration of a battery pack according to an embodiment of the present technology.
Figure 2:
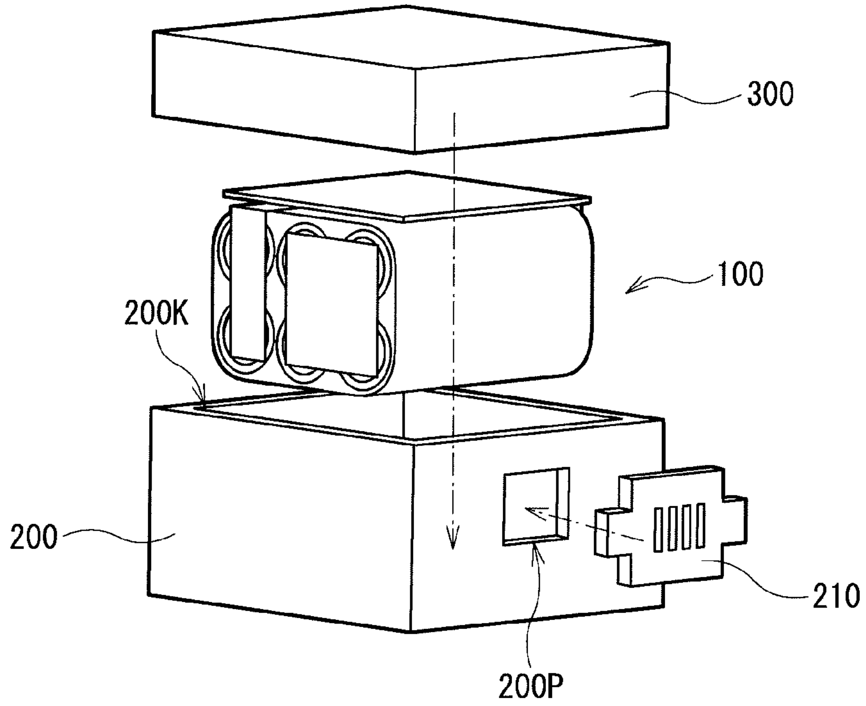
FIG. 2 is an exploded perspective view of the battery pack illustrated in FIG. 1.

FIG. 1 illustrates a perspective configuration of a battery pack, and FIG. 2 illustrates an exploded perspective configuration of the battery pack illustrated in FIG. 1. FIG. 2 illustrates a state in which a battery module 100, an exterior case 200, and a case lid 300 are isolated from each other.

As illustrated in FIGS. 1 and 2, the battery pack includes the battery module 100, the exterior case 200, and the case lid 300.

The battery module 100 is accommodated inside the exterior case 200, and generates electric power using a plurality of secondary batteries 10 described later.

The battery module 100 includes the plurality of secondary batteries 10, a control board 60, and the like. A detailed configuration of the battery module 100 will be described later (see FIG. 3).

As illustrated in FIGS. 1 and 2, the exterior case 200 is an accommodating member that accommodates the battery module 100 inside. The exterior case 200 has a box-like structure in which one end is closed and the other end is opened, and thus has a cavity 200K at the other end. A material of the exterior case 200 is not particularly limited, and can be arbitrarily set.

A through hole 200P is provided in a side surface of the exterior case 200, and a heat dissipation plate 210 having a slit window for heat dissipation is attached to the through hole 200P. Here, the heat dissipation plate 210 is fixed to the exterior case 200 by a fixing screw (not illustrated). Here, FIG. 1 illustrates a state in which the heat dissipation plate 210 is attached to the exterior case 200, and FIG. 2 illustrates a state in which the heat dissipation plate 210 is detached from the exterior case 200.

As illustrated in FIGS. 1 and 2, the case lid 300 is a shielding member that shields the cavity 200K of the exterior case 200. The case lid 300 is attached to the exterior case 200 in a state where the battery module 100 is accommodated inside the exterior case 200. The material of the case lid 300 is not particularly limited similarly to the material of the exterior case 200, and thus can be arbitrarily set.

Figure 3:
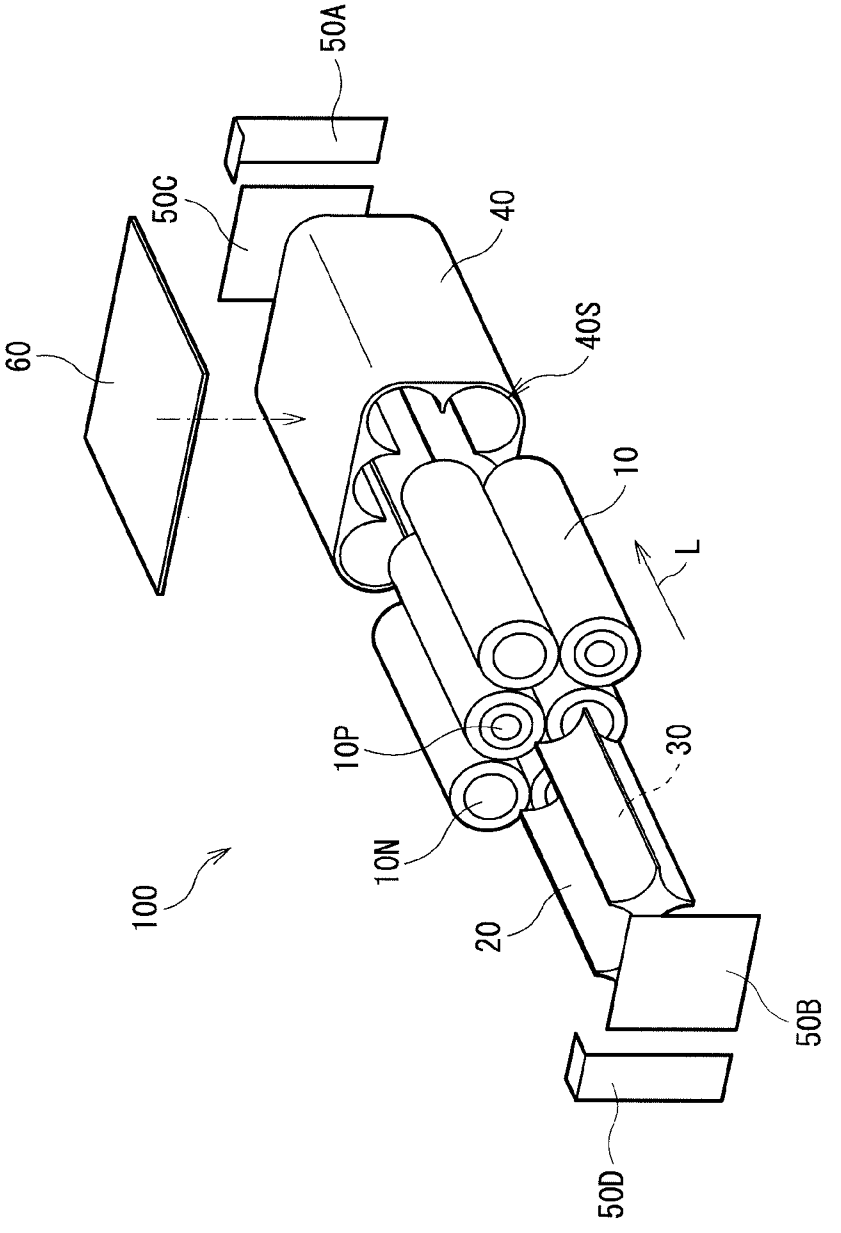
FIG. 3 is an exploded perspective view of a battery module illustrated in FIG. 2.
Figure 4:
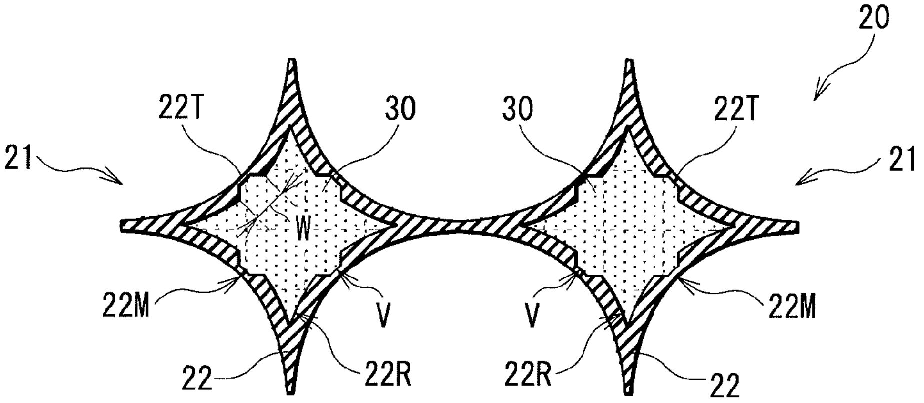
FIG. 4 is an enlarged sectional view illustrating a configuration of a partition plate illustrated in FIG. 3.
Figure 6:
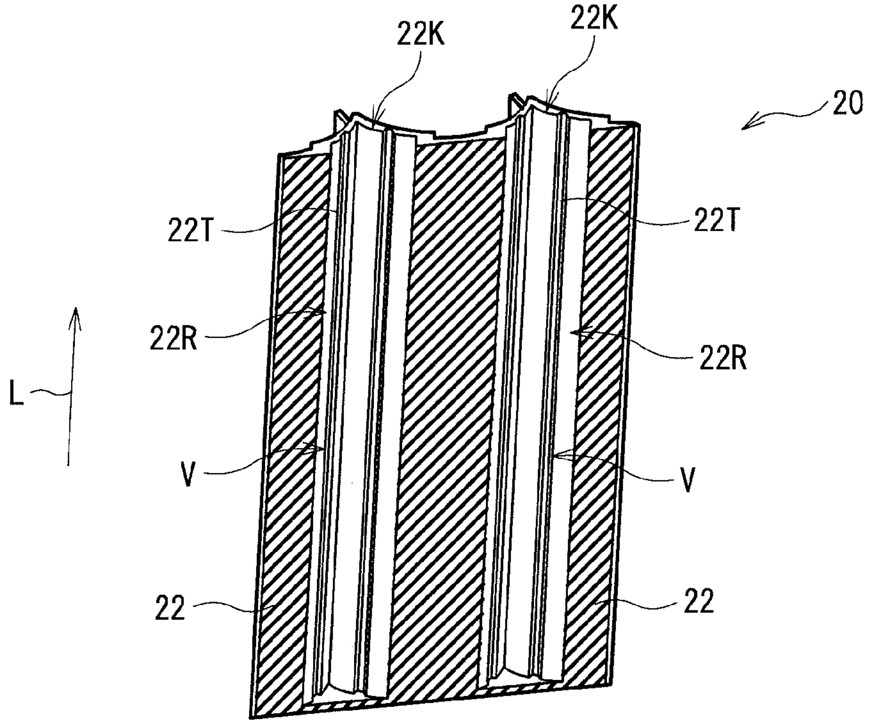
FIG. 6 is another enlarged perspective sectional view illustrating a configuration of a partition plate illustrated in FIG. 3.
Figure 7:
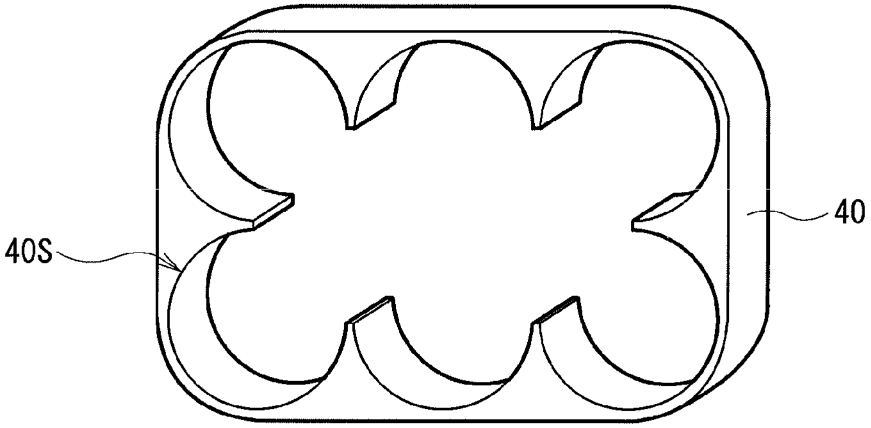
FIG. 7 is an enlarged perspective view illustrating a configuration of a battery holder illustrated in FIG. 3.

FIG. 3 illustrates an exploded perspective configuration of the battery module 100 illustrated in FIG. 2. FIG. 4 illustrates an enlarged sectional configuration of a partition plate 20 illustrated in FIG. 3, and FIGS. 5 and 6 each illustrate an enlarged perspective configuration of the partition plate 20 illustrated in FIG. 3. FIG. 7 illustrates an enlarged perspective configuration of a battery holder 40 illustrated in FIG. 3. Here, FIG. 6 also illustrates a sectional configuration of the partition plate 20.

Figure 5:
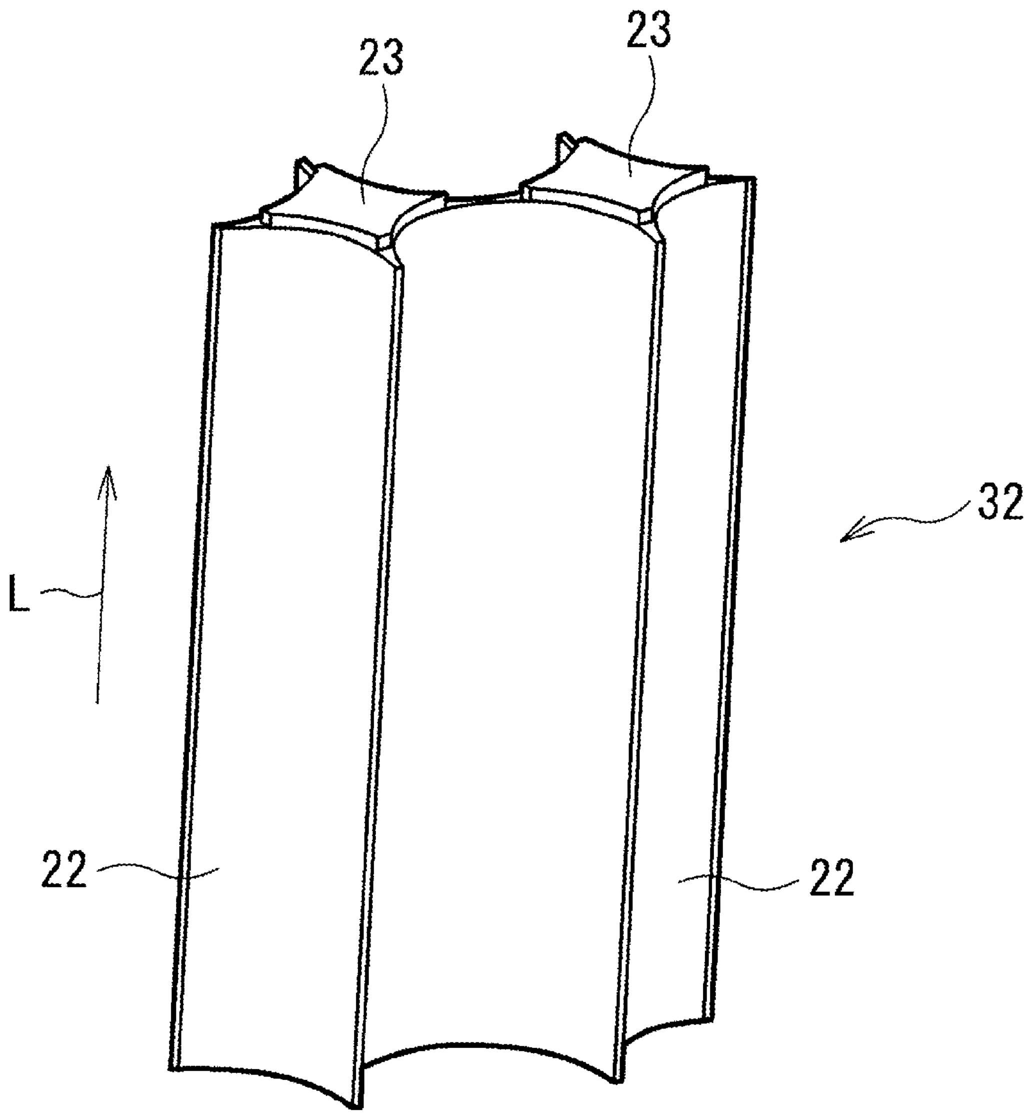
FIG. 5 is an enlarged perspective view illustrating a configuration of a partition plate illustrated in FIG. 3.

FIG. 3 illustrates a state in which the plurality of secondary batteries 10, the partition plate 20, the battery holder 40, lead plates 50A to 50D, and a control board 60 are isolated from each other. FIG. 4 illustrates a section intersecting with the extending direction (length direction L described later) of the partition plate 20, and illustrates that a heat absorbing agent 30 is shaded. FIG. 5 illustrates the appearance of the partition plate 20 in order to make the entire configuration of the partition plate 20 easily viewable, and FIG. 6 illustrates a state in which the partition plate 20 is cut in the extending direction in order to make the internal configuration of the partition plate 20 easily viewable.

As illustrated in FIG. 3, the battery module 100 includes the plurality of secondary batteries 10, the partition plate 20, the heat absorbing agent 30, the battery holder 40, the lead plates 50A to 50D, and the control board 60.

As illustrated in FIG. 3, each of the plurality of secondary batteries 10 is a so-called cylindrical lithium ion secondary battery, and extends in the length direction L. The secondary battery 10 has a protruding positive electrode terminal portion 10P that is provided at one end in the length direction L and a non-protruding negative electrode terminal portion 10N that is provided at the other end in the length direction L.

A partition plate 20 is arranged between the plurality of secondary batteries 10, and a battery holder 40 is arranged around the plurality of secondary batteries 10. As a result, the plurality of secondary batteries 10 is held by the battery holder 40 while being isolated from each other by the partition plate 20.

The number of the secondary batteries 10 is not particularly limited. Here, the battery module 100 includes six secondary batteries 10, and the six secondary batteries 10 are arranged in three columns×two rows.

Two rows of the secondary batteries 10 arranged in the first column (right side) are arranged in such a manner that the positive electrode terminal portion 10P faces the back side (the side facing the battery holder 40 in FIG. 3). Two rows of the secondary batteries 10 arranged in the second column (center) are arranged in such a manner that the positive electrode terminal portion 10P faces the front side (the side facing the partition plate 20 in FIG. 3). Two rows of the secondary batteries 10 arranged in the third column (left side) are arranged in such a manner that the positive electrode terminal portion 10P faces the back side. As a result, the six secondary batteries 10 are electrically connected to each other in such a manner of being two horizontal rows×three vertical columns with the lead plates 50A to 50D interposed therebetween.

The detailed configuration of the secondary battery 10 (cylindrical lithium ion secondary battery) will be described later (see FIG. 8).

As illustrated in FIGS. 3 to 6, the partition plate 20 is an isolating member arranged between the plurality of secondary batteries 10, and extends in the length direction L. Since the partition plate 20 is inserted into a gap provided between the plurality of secondary batteries 10, the plurality of secondary batteries 10 is supported while being isolated from each other. As a result, the distance between the plurality of secondary batteries 10 is maintained to be a predetermined distance by the partition plate 20.

In addition, since the partition plate 20 has a three-dimensional shape corresponding to a gap (space) provided between the plurality of secondary batteries 10, the partition plate is in contact with each of the plurality of secondary batteries 10 in a state of being inserted into the gap. This is for supporting the plurality of secondary batteries 10 while isolating the plurality of secondary batteries 10 from each other.

The partition plate 20 houses the heat absorbing agent 30 inside. Thus, the partition plate 20 has a function of releasing the heat absorbing agent 30 toward the secondary batteries 10 at the time of abnormality occurrence (at the time of heat generation or ignition of the secondary battery 10) while maintaining the housed state of the heat absorbing agent 30 at the normal time. Details of the function of the partition plate 20 described here will be described later.

Specifically, the partition plate 20 includes a partition portion 21 capable of supporting four secondary batteries 10 while isolating the four secondary batteries 10 from each other, and the partition portion 21 includes a housing portion 22 and a lid portion 23.

Here, as described above, since the number of the secondary batteries 10 is six, the partition plate 20 includes two partition portions 21, and the two partition portions 21 are coupled to each other in the direction intersecting the length direction L.

The housing portion 22 is a member that supports four secondary batteries 10 while isolating the four secondary batteries 10 from each other and houses the heat absorbing agent 30 inside, and extends in the length direction L. Since the housing portion 22 has a vessel-like structure in which one end is closed and the other end is opened, the other end has a cavity 22K.

In addition, in order to support four secondary batteries 10, more specifically, the four secondary batteries 10 arranged in two columns×2 rows while isolating the four secondary batteries 10 from each other, the housing portion 22 has four support surfaces 22M that can contact the four secondary batteries 10. Here, as described above, since the secondary battery 10 is a cylindrical lithium ion secondary battery, the support surface 22M is a concave curved surface. A pair of support surfaces 22M among the four support surfaces 22M is arranged in a manner of facing each other with a housing space 22R to be described later interposed therebetween, and the remaining pair of support surfaces 22M is similarly arranged in a manner of facing each other with the housing space 22R interposed therebetween.

Since the housing portion 22 has a vessel-like structure provided with the cavity 22K as described above, the housing space 22R is provided inside. The housing space 22R is a first housing space in which the heat absorbing agent 30 is housed, and extends in the length direction L.

Here, since the wall thickness of the housing portion 22, that is, the wall thickness of the side wall defining the housing space 22R in the housing portion 22 is not constant over the entire area and is locally thin, the housing portion 22 has a thin portion 22T having a locally thin wall thickness. The phrase “locally thin wall thickness” means that, when the wall thickness of the housing portion 22 at the place where the thin portion 22T is provided is compared with the wall thickness of the housing portion 22 at the place where the thin portion 22T is not provided, the former wall thickness is thinner than the latter wall thickness. Since the thin portion 22T is the first thin portion provided in at least a part of the region where the housing space 22R faces each of four secondary batteries 10, the housing portion 22 has the thin portion 22T in at least a part of the region where the housing space 22R faces the secondary batteries 10.

The reason why the housing portion 22 has the thin portion 22T is that, as will be described later, when the secondary battery 10 generates heat or ignites at the time of abnormality occurrence, the housing portion 22 (thin portion 22T) is intentionally melted using the heat generated by the heat generation or the ignition, and thus the open port 22Q is formed at the place where the thin portion 22T was provided (see FIG. 9). As a result, the heat absorbing agent 30 housed inside the partition plate 20 (housing space 22R) is released from the open port 22Q toward the secondary battery 10, and thus the secondary battery 10 is cooled or extinguished by the heat absorbing agent 30. Details of the reason described here will be described later.

The thin portion 22T is a part of the housing portion 22 and functions as a so-called melting portion. The melting portion is a portion that melts (preferentially) before the portion other than the melting portion, and is provided in at least a part of the region where the secondary battery 10 and the heat absorbing agent 30 face each other. Here, as described above, the melting portion is a portion having a thinner thickness than the portion other than the melting portion.

The reason why the housing portion 22 has the thin portion 22T functioning as a melting portion is that when the secondary battery 10 generates heat or ignites at the time of abnormality occurrence, the housing portion 22 is locally melted in the melting portion (thin portion 22T) as described later. As a result, since the housing portion 22 releases the heat absorbing agent 30 toward the secondary battery 10 (see FIG. 9), the secondary battery 10 is cooled or extinguished by the heat absorbing agent 30 as described above.

The aspect in which the thin portion 22T is provided in the housing portion 22 is not particularly limited, and thus can be arbitrarily set. In particular, since the housing portion 22 has a recess V inside communicating with the housing space 22R in the region where the thin portion 22T is provided, the thin portion 22T is preferably formed using the recess V provided inside the housing portion 22. This is because, as compared with a case where the recess V is provided outside the housing portion 22 for forming the thin portion 22T, the volume of the housing space 22R increases, and thus the housing amount of the heat absorbing agent 30 increases, and the thin portion 22T approaches the secondary battery 10, and therefore the thin portion 22T is more likely to be melted using the heat generated at the time of heat generation or ignition of the secondary battery 10.

The recess V has an opening width W, and the opening width W may be constant or may change in the depth direction. In particular, it is preferable that the opening width W gradually decreases toward an outer side of the partition plate 20. This is because the housing portion 22 is less likely to be damaged, and thus the heat absorbing agent 30 is prevented from being unintentionally released to the outside from the partition plate 20 (housing space 22R) at the normal time.

Specifically, when the opening width W is constant, the wall thickness of the housing portion 22 rapidly decreases in the recess V. In this case, when the partition plate 20 is subjected to vibration, impact, or the like, stress tends to concentrate on the thin portion 22T, more specifically, a part of the thin portion 22T facing a corner portion of the recess V, and thus the thin portion 22T may be unintentionally cleaved. As a result, since the housing portion 22 is damaged, the heat absorbing agent 30 may be unintentionally released at the normal time.

On the other hand, when the opening width W gradually decreases toward an outer side of the partition plate 20, the wall thickness of the housing portion 22 gradually decreases in the recess V. In this case, when the partition plate 20 is subjected to vibration, impact, or the like, stress is still less likely to concentrate on a part of the thin portion 22T, and thus the thin portion 22T is less likely to be cleaved. As a result, since the housing portion 22 is less likely to be damaged, the heat absorbing agent 30 is less likely to be released at the normal time.

The installation range of the thin portion 22T is not particularly limited, and can be arbitrarily set. In particular, since the recess V extends in the length direction L and the recess V is formed to have a so-called groove shape, it is preferable that the thin portion 22T similarly extends in the length direction L. This is because the release range of the heat absorbing agent 30 released toward the secondary battery 10 increases, and thus the secondary battery 10 is more likely to be cooled or extinguished by the heat absorbing agent 30.

The wall thickness of the thin portion 22T is not particularly limited, and can be arbitrarily set. As an example, when the wall thickness of the thin portion 22T is T1 and the wall thickness of a portion other than the thin portion 22T is T2, the ratio T1/T2 is preferably from 0.2 to 0.5 inclusive.

When the ratio T1/T2 is smaller than 0.2, the thickness T1 is too thin, and thus there is a possibility that the housing portion 22 is unintentionally damaged depending on the magnitude of vibration, impact, or the like, and there is a possibility that the housing portion 22 is hardly formed using a molding method. When the housing portion 22 is damaged, as described later, there is a possibility that the heat absorbing agent 30 is unintentionally released to the outside from the partition plate 20 (housing space 22R) at the normal time. The impact is an impact generated when the battery pack falls, an impact generated when some object collides with the battery pack, and the like. In addition, the damage is occurrence of a crack or the like.

On the other hand, when the ratio T1/T2 is larger than 0.5, the thickness T1 is too thick, and thus there is a possibility that the open port 22Q is hardly formed in the housing portion 22 at the time of abnormality occurrence. In this case, there is a possibility that the heat absorbing agent 30 is hardly released to the outside from the partition plate 20 (housing space 22R).

The lid portion 23 is a member that closes the cavity 22K provided in the housing portion 22. The housing portion 22 is sealed by the lid portion 23 in a state where the heat absorbing agent 30 is housed in the housing space 22R.

The planar shape of the lid portion 23 is not particularly limited, and is specifically a planar shape corresponding to the sectional shape of the housing portion 22, that is, a shape corresponding to the shape defined by the outer edge of the housing portion 22.

In order to close the cavity 22K, the lid portion 23 may be fixed to the housing portion 22 using a thermal welding method or the like, or may be fixed to the housing portion 22 using an adhesive such as a potting material.

The partition plate 20 contains a thermoplastic resin, more specifically, contains any one or two or more kinds of amorphous engineering plastics. That is, each of the housing portion 22 and the lid portion 23 constituting the partition portion 21 contains any one or two or more kinds of amorphous engineering plastics.

The kind of the amorphous engineering plastics is not particularly limited, and specific examples thereof include a polycarbonate and a modified polyphenylene ether. This is because the physical (mechanical) strength of the partition plate 20 at the normal time is secured, while the melting property of the partition plate 20 at the time of abnormality occurrence is secured. Here, the kind of the amorphous engineering plastics as the material for forming the housing portion 22 and the kind of the amorphous engineering plastics as the material for forming the lid portion 23 may be the same or different from each other.

The reason why the partition plate 20 contains the amorphous engineering plastic is that, unlike the case where the partition plate 20 contains the crystalline polymer compound, the physical strength of the partition plate 20 is secured at the normal time, while the heat absorbing agent 30 can be released to the outside using the melting of the thin portion 22T at the time of abnormality occurrence. As a result, the melting temperature of the partition plate 20 corresponds to the temperature range of the battery pack at the time of abnormality occurrence, and is specifically about 100 °C to 150 °C inclusive.

Specific examples of the crystalline polymer compound include polyethylene terephthalate (PET), polypropylene (PP), polyethylene (PE), and the like. Since the melting temperature of the crystalline polymer compound is higher than the temperature range (about 100 °C to 150 °C inclusive) of the battery pack at the time of abnormality occurrence described above, the crystalline polymer compound cannot be melted in the temperature range.

Since the partition plate 20 contains the amorphous engineering plastic, advantages can be obtained also from the viewpoint described below as compared with the case where the partition plate 20 contains the crystalline polymer compound.

The crystalline polymer compound has high heat resistance and rigidity, but has low toughness. Thus, when the partition plate 20 includes the crystalline polymer compound, the partition plate 20 (thin portion 22T) is more likely to be damaged due to vibration, impact, and the like, and therefore the heat absorbing agent 30 is more likely to be unintentionally released to the outside at the normal time. Therefore, it is difficult to release the heat absorbing agent 30 to the outside only when necessary (at the time of abnormality occurrence).

On the other hand, unlike the crystalline polymer compound, the amorphous engineering plastic has appropriate rigidity and sufficiently high toughness. Thus, when the partition plate 20 contains the amorphous engineering plastic, the partition plate 20 (thin portion 22T) is less likely to be damaged due to vibration, impact, and the like, and therefore the heat absorbing agent 30 is less likely to be released to the outside at the normal time. Therefore, the heat absorbing agent 30 can be released to the outside only when necessary.

As described above, since the partition plate 20 contains the amorphous engineering plastic, the heat absorbing agent 30 can be released to the outside only when necessary, which is similar to the case where the partition plate has a thin film shape. That is, when the partition plate 20 has a thin film shape, the partition plate 20 is more likely to be cleaved due to vibration, impact, and the like, and therefore it is difficult to release the heat absorbing agent 30 to the outside only when necessary.

Note that the member to be intentionally melted at the time of abnormality occurrence is only the housing portion 22 provided with the thin portion 22T. Therefore, as long as the housing portion 22 contains the amorphous engineering plastic, the lid portion 23 in which the thin portion 22T is not provided may contains a material other than the amorphous engineering plastic.

As illustrated in FIGS. 3 and 4, the heat absorbing agent 30 is housed inside the partition plate 20, more specifically, housed in the housing space 22R. As described above, the heat absorbing agent 30 is used to cool or extinguish the secondary battery 10 by being released to the outside using the melting of the partition plate 20 (thin portion 22T) at the time of abnormality occurrence.

The kind of the heat absorbing agent 30 is not particularly limited as long as it is a material having fluidity that can be released to the outside of the partition plate 20 (housing space 22R) at the time of abnormality occurrence and having cooling property that can cool or extinguish the secondary battery 10 heated or burned.

Specifically, the heat absorbing agent 30 preferably contains water. This is because excellent fluidity and excellent cooling property can be obtained.

The heat absorbing agent 30 may be in a liquid state or a gel state as long as it has the fluidity and cooling property described above.

A specific example of the heat absorbing agent 30 in a liquid state is water. In this case, the heat absorbing agent 30 may further contain any one or two or more kinds of liquids other than water. Here, the heat absorbing agent 30 containing a liquid other than water together with water preferably contains the water as a main component.

The heat absorbing agent 30 in a gel state is a hydrogel containing water or the like, and the hydrogel may be a biopolymer gel, a synthetic polymer gel, or both. Specific examples of the biopolymer gel are agar and the like. Since the synthetic polymer gel contains a polymer compound together with water, the synthetic polymer gel has a gel state in which water is retained by the polymer compound. The kind of the polymer compound is not particularly limited, and specific examples thereof include sodium polyacrylate (PNaAA), polyvinyl alcohol (PVA), polyhydroxyethyl methacrylate (PHE-MA), and silicone hydrogel.

In particular, the heat absorbing agent 30 is preferably in a gel state. This is because the viscosity of the heat absorbing agent 30 increases. As a result, when the heat absorbing agent 30 is released toward the secondary battery 10 at the time of abnormality occurrence, a state in which the heat absorbing agent 30 adheres to the secondary battery 10 is more likely to be maintained. Therefore, since the heat absorbing agent 30 is less likely to fall off from the secondary battery 10, the secondary battery 10 is more likely to be cooled or extinguished by the heat absorbing agent 30.

The heat absorbing agent 30 in a gel state is preferably a synthetic polymer gel, and more preferably contains sodium polyacrylate as a polymer compound. This is because sodium polyacrylate has high water retentivity. This is because the heat absorbing agent 30 containing sodium polyacrylate as a product by partial neutralization has high adhesiveness.

As illustrated in FIGS. 3 and 7, the battery holder 40 is a holding member arranged around the plurality of secondary batteries 10, and holds the plurality of secondary batteries 10 isolated from each other by the partition plate 20.

The battery holder 40 has a frame structure in which one end and the other end in the length direction L are opened respectively, and has an insertion port 40S into which the secondary battery 10 is inserted. Here, as described above, since the six secondary batteries 10 are arranged in 3 columns×2 rows, the battery holder 40 has six insertion ports 40S.

A material for forming the battery holder 40 is not particularly limited, and can be arbitrarily set. That is, the material for forming the battery holder 40 may be the same as or different from the material for forming the partition plate 20.

In a case where the material for forming the battery holder 40 is different from the material for forming the partition plate 20, the battery holder 40 contains any one or two or more kinds of crystalline polymer compounds, and specific examples of the crystalline polymer compounds include polyethylene terephthalate (PET), polypropylene (PP), polyethylene (PE), and the like. This is because excellent physical strength can be obtained. In addition, this is because, since the battery holder 40 has a melting point high enough still not to melt at the time of abnormality occurrence, the plurality of secondary batteries 10 is more likely to be held stably by the battery holder 40.

The lead plates 50A to 50D are connection members for electrically connecting the plurality of secondary batteries 10 to each other.

Each of the lead plates 50A and 50D has a substantially plate-like structure connectable to two secondary batteries 10, and each of the lead plates 50B and 50C has a substantially plate-like structure connectable to four secondary batteries 10.

Here, as described below, six secondary batteries 10 arranged in 3 columns×2 rows illustrated in FIG. 3 are classified.

Secondary battery 10 located on the right side of the first row: first secondary battery 10

Secondary battery 10 located on the right side of the second row: second secondary battery 10

Secondary battery 10 located at the center of the first row: third secondary battery 10

Secondary battery 10 located at the center of the second row: fourth secondary battery 10

Secondary battery 10 located on the left side of the first row: fifth secondary battery 10

Secondary battery 10 located on the left side of the second row: sixth secondary battery 10

In this case, six secondary batteries 10 are electrically connected to each other in such a manner of being two horizontal rows×three vertical columns with the lead plates 50A to 50D interposed therebetween, as described below.

The positive electrode terminal portion 10P of each of the first and second secondary batteries 10 is connected to the lead plate 50A, and the negative electrode terminal portion 10N of each of the first and second secondary batteries 10 is connected to the lead plate 50B. The positive electrode terminal portion 10P of each of the third and fourth secondary batteries 10 is connected to the lead plate 50B, and the negative electrode terminal portion 10N of each of the third and fourth secondary batteries 10 is connected to the lead plate 50C. The positive electrode terminal portion 10P of each of the fifth and sixth secondary batteries 10 is connected to the lead plate 50C, and the negative electrode terminal portion 10N of each of the fifth and sixth secondary batteries 10 is connected to the lead plate 50D.

The control board 60 is a mounting board on which a plurality of electronic components is mounted, and controls the operation of the battery pack. Here, the control board 60 is arranged between the battery holder 40 and the case lid 300, and is connected to each of the lead plates 50A and 50D.

Figure 8:
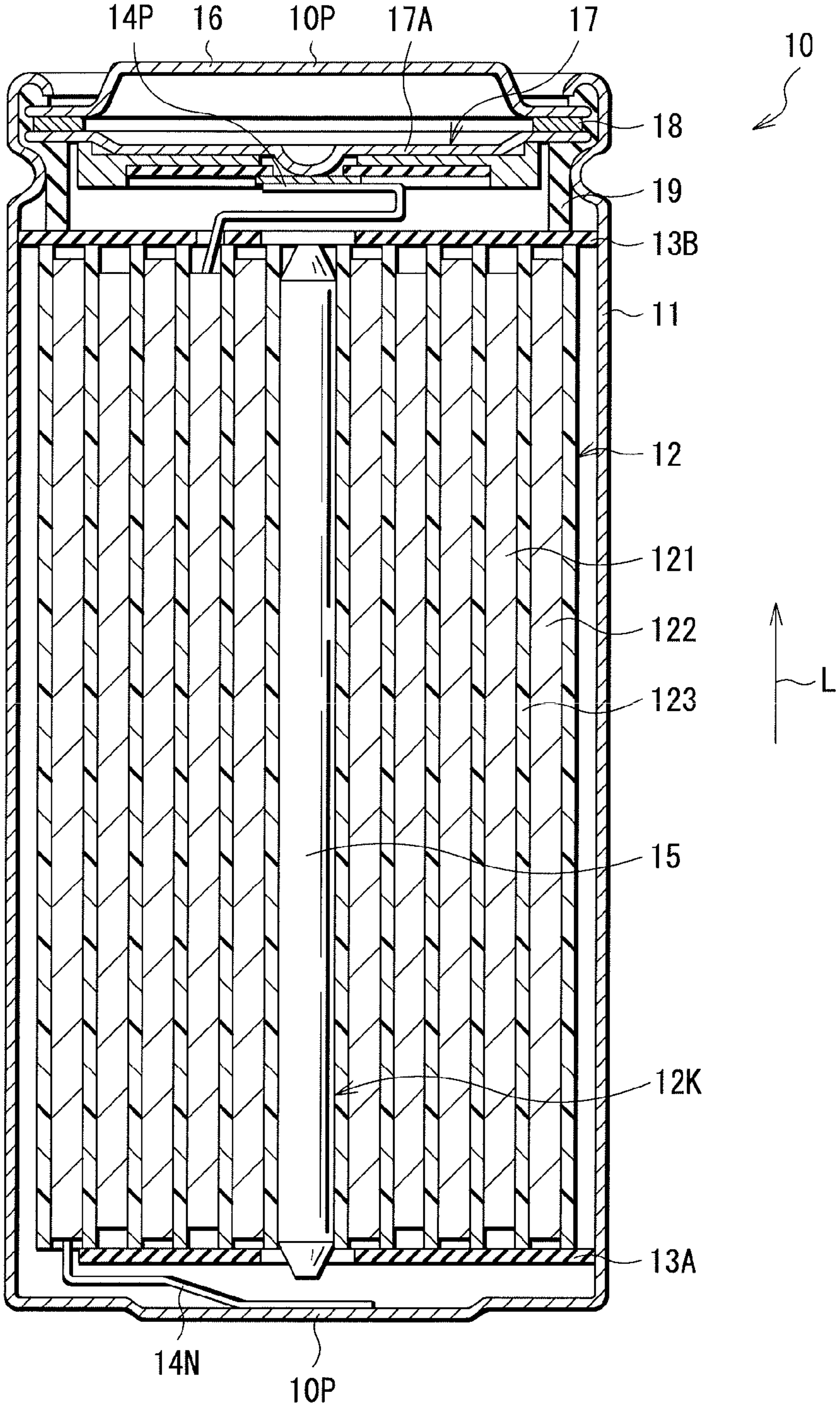
FIG. 8 is an enlarged sectional view illustrating a configuration of a secondary battery illustrated in FIG. 3.

FIG. 8 illustrates an enlarged sectional configuration of the secondary battery 10 illustrated in FIG. 3. As described above, the secondary battery 10 is a cylindrical lithium ion secondary battery, and includes an electrolytic solution which is a liquid electrolyte together with the positive electrode 121 and the negative electrode 122.

In the secondary battery 10, the charge capacity of the negative electrode 122 is larger than the discharge capacity of the positive electrode 121. That is, the electrochemical capacity per unit area of the negative electrode 122 is set to be larger than the electrochemical capacity per unit area of the positive electrode 121. This is to prevent the electrode reactant from precipitating on the surface of the negative electrode 122 during charging.

Specifically, as illustrated in FIG. 8, the secondary battery 10 includes a battery can 11, a battery element 12, a pair of insulating plates 13A and 13B, a positive electrode lead 14P, and a negative electrode lead 14N.

The battery can 11 is an accommodating member that accommodates the battery element 12 and the like, and has a vessel-like structure in which one end portion is closed and the other end portion is opened. The battery can 11 contains a conductive material such as iron. Here, a metal material such as nickel may be plated on the surface of the battery can 11.

Since the insulating plates 13A and 13B are arranged in a manner of facing each other with the battery element 12 interposed therebetween, the battery element 12 is sandwiched between the insulating plates 13A and 13B.

A battery cover 16, a safety valve mechanism 17, and a heat sensitive resistance element (PTC element) 18 are crimped to an open end portion which is one open end portion of the battery can 11 with a gasket 19 interposed therebetween. As a result, the open end portion of the battery can 11 is sealed by the battery cover 16, and the battery cover 16 is fixed to the open end portion of the battery can 11. Here, the battery cover 16 contains the same material as the material for forming the battery can 11. Each of the safety valve mechanism 17 and the PTC element 18 is provided inside the battery cover 16, and the safety valve mechanism 17 is electrically connected to the battery cover 16 via the PTC element 18. The gasket 19 contains an insulating material, and asphalt or the like may be applied to the surface of the gasket 19.

In the safety valve mechanism 17, when the internal pressure of the battery can 11 reaches a certain level or more due to an internal short circuit or the like, a disk plate 17A is reversed, and thus the electrical connection between the battery cover 16 and the battery element 12 is disconnected. In order to prevent abnormal heat generation due to a large current, the electrical resistance of the PTC element 18 increases as the temperature rises.

The battery element 12 is a power generating element including a positive electrode 121, a negative electrode 122, a separator 123, and an electrolytic solution (not illustrated).

The battery element 12 is a so-called wound electrode body. That is, the positive electrode 121 and the negative electrode 122 are stacked with the separator 123 interposed therebetween, and the positive electrode 121 and the negative electrode 122 are wound while facing each other with the separator 123 interposed therebetween. A center pin 15 is inserted into a winding center space 12K provided at the winding center of the battery element 12. Here, the center pin 15 may be omitted.

The positive electrode 121 includes a positive electrode current collector and a positive electrode active material layer.

The positive electrode current collector has a pair of surfaces on which the positive electrode active material layer is provided, and contains a conductive material such as aluminum. The positive electrode active material layer is provided on one surface or both surfaces of the positive electrode current collector, and contains any one or two or more kinds of positive electrode active materials that occlude and release lithium ions. Here, the positive electrode active material layer may further contain any one or two or more kinds of other materials such as a positive electrode binder and a positive electrode conductive agent.

The kind of the positive electrode active material is not particularly limited, and is specifically a lithium-containing compound. This lithium-containing compound is a compound containing one or two or more kinds of transition metal elements as constituent elements together with lithium, and specific examples thereof include an oxide, a phosphoric acid compound, a silicic acid compound, and a boric acid compound. Specific examples of the oxide include $LiNiO_2$, $LiCoO_2$, $LiMn_2O_4$, and the like, and specific examples of the phosphoric acid compound include $LiFePO_4$, $LiMnPO_4$, and the like.

The positive electrode binder is one or both of a synthetic rubber and a polymer compound. Specific examples of the synthetic rubber are styrene butadiene-based rubber and the like, and specific examples of the polymer compound are polyvinylidene fluoride and the like. The positive electrode conductive agent is any one or two or more kinds of conductive materials such as a carbon material, a metal material, and a conductive polymer compound, and specific examples of the carbon material are graphite and the like.

The negative electrode 122 includes a negative electrode current collector and a negative electrode active material layer.

The negative electrode current collector has a pair of surfaces on which the negative electrode active material layer is provided, and contains a conductive material such as copper. The negative electrode active material layer is provided on one surface or both surfaces of the negative electrode current collector, and contains any one or two or more kinds of negative electrode active materials that occlude and release lithium ions. Here, the negative electrode active material layer may further contain any one or two or more kinds of other materials such as a negative electrode binder and a negative electrode conductive agent.

The kind of the negative electrode active material is not particularly limited, and specific examples thereof include a carbon material, a metal-based material, and the like. Specific examples of the carbon material include graphite (natural graphite or artificial graphite) and the like. The metal-based material is a material including any one kind or two or more kinds of metal elements and metalloid elements capable of forming an alloy with lithium as constituent elements, and specific examples of the metal elements and metalloid elements are silicon, tin, and the like. The metal-based material may be a simple substance, an alloy, a compound, a mixture of two or more thereof, or a material including two or more phases thereof. Specific examples of the metal-based material include $TiSi_2$, $SiO_x$ ($0<x\leq 2$ or $0.2<x<1.4$), and the like. Details regarding each of the negative electrode binder and the negative electrode conductive agent are the same as the details regarding each of the positive electrode binder and the positive electrode conductive agent.

The separator 123 is an insulating porous film interposed between the positive electrode 121 and the negative electrode 122, and allows lithium ions to pass therethrough while preventing contact (short circuit) between the positive electrode 121 and the negative electrode 122. The separator 123 contains a polymer compound such as polyethylene.

The electrolytic solution impregnates each of the positive electrode 121, the negative electrode 122, and the separator 123, and contains a solvent and an electrolyte salt.

Here, the solvent contains any one or two or more kinds of non-aqueous solvents (organic solvents), and the electrolytic solution containing the non-aqueous solvent is a so-called non-aqueous electrolytic solution.

The non-aqueous solvent contains any one or two or more kinds of a cyclic carbonate ester, a chain carbonate ester, a chain carboxylate ester, a lactone, and the like. Specific examples of the cyclic carbonate ester include ethylene carbonate, propylene carbonate, and the like. Specific examples of the chain carbonate ester include dimethyl carbonate, diethyl carbonate, ethyl methyl carbonate, and the like. Specific examples of the chain carboxylic acid ester include ethyl acetate, ethyl propionate, propyl propionate, and the like. Specific examples of the lactone include γ-butyrolactone, γ-valerolactone, and the like.

The electrolyte salt is a light metal salt such as a lithium salt. Specific examples of the lithium salt include lithium hexafluorophosphate ($LiPF_6$), lithium tetrafluoroborate ($LiBF_4$), lithium trifluoromethanesulfonate ($LiCF_3SO_3$), lithium bis (fluorosulfonyl) imide ($LiN(FSO_2)_2$), lithium bis (trifluoromethanesulfonyl) imide ($LiN(CF_3SO_2)_2$), lithium tris (trifluoromethanesulfonyl) methide ($LiC(CF_3SO_2)_3$), lithium bis (oxalato) borate ($LiB(C_2O_4)_2$), and lithium difluoro (oxalato) borate (($LiB(C_2O_4)F_2$).

The content of the electrolyte salt is not particularly limited, and is specifically 0.3 mol/kg to 3.0 mol/kg inclusive with respect to the solvent. This is because high ion conductivity can be obtained.

The positive electrode lead 14P is connected to the positive electrode current collector of the positive electrode 121 and contains a conductive material such as aluminum. The positive electrode lead 14P is electrically connected to the battery cover 16 via the safety valve mechanism 17.

The negative electrode lead 14N is connected to the negative electrode current collector of the negative electrode 122 and contains a conductive material such as nickel. The negative electrode lead 14N is electrically connected to the battery can 11.

Figure 9:
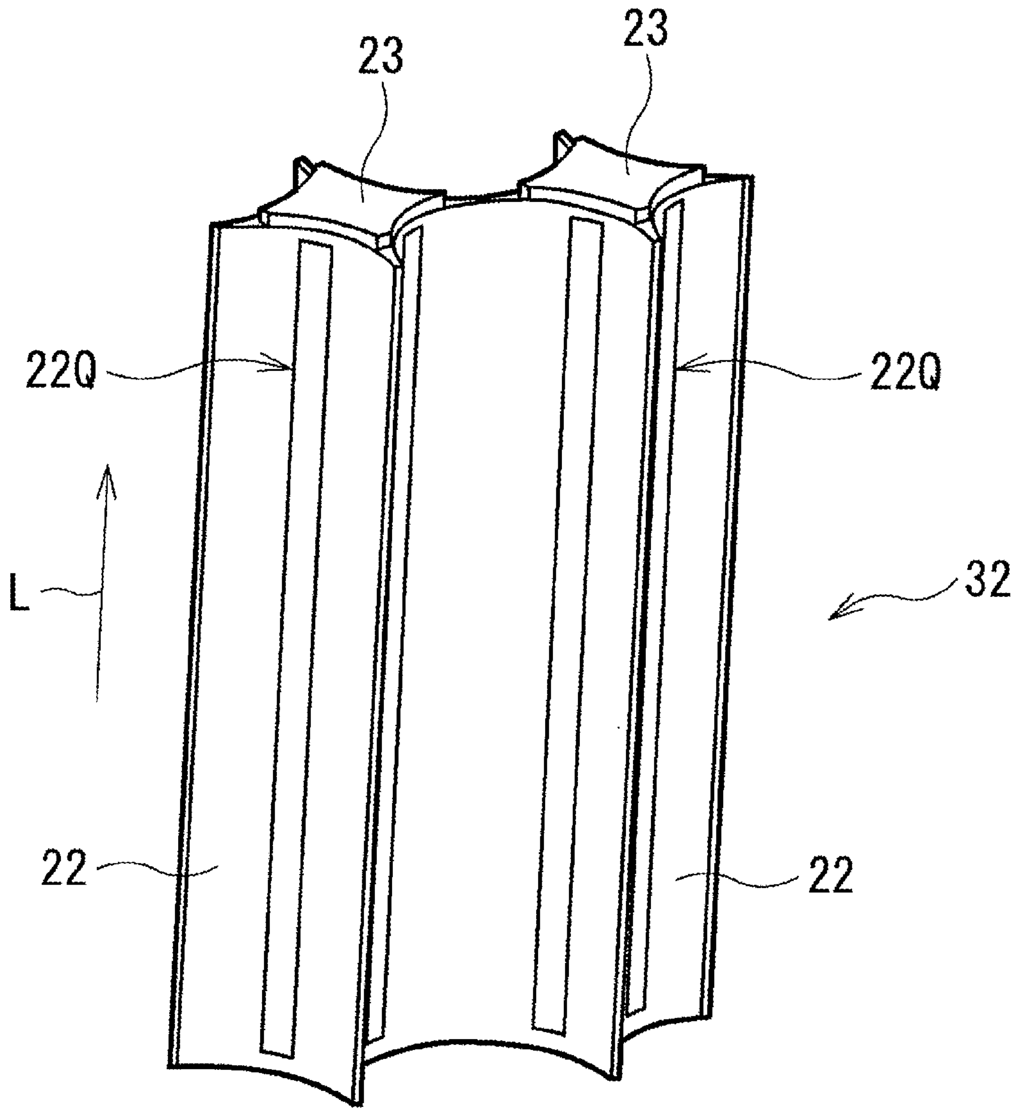
FIG. 9 is a perspective view for describing an operation of the battery pack at the time of abnormality occurrence.

FIG. 9 illustrates a perspective configuration corresponding to FIG. 5 in order to describe the operation of the battery pack at the time of abnormality occurrence. Hereinafter, the operation at the time of charging and discharging will be described, and then the operation at the time of abnormality occurrence will be described.

At the time of charging, in each of the plurality of secondary batteries 10 mounted on the battery module 100, lithium ions are released from the positive electrode 121, and the lithium ions are occluded in the negative electrode 122 through the electrolytic solution.

On the other hand, at the time of discharging, in each of the plurality of secondary batteries 10, lithium ions are released from the negative electrode 122, and the lithium ions are occluded in the positive electrode 121 through the electrolytic solution.

As described above, the heat absorbing agent 30 is housed in the housing space 22R provided in the partition plate 20.

At the normal time when each of the plurality of secondary batteries 10 does not generate heat or ignite, since the housing portion 22 is closed in the thin portion 22T, the housing portion 22 is sealed in a state in which the heat absorbing agent 30 is housed in the housing space 22R.

In this case, since the partition plate 20 contains the amorphous engineering plastic, the partition plate 20 has appropriate rigidity and sufficiently high toughness as described above. As a result, the partition plate 20 (thin portion 22T) is less likely to be damaged due to vibration or impact, and therefore the heat absorbing agent 30 is prevented from being released to the outside from the partition plate 20 (housing space 22R) in at the normal time.

On the other hand, when an abnormality occurs due to heat generation or ignition of any one of the plurality of secondary batteries 10, the plurality of secondary batteries 10 are isolated from each other with the partition plate 20 interposed therebetween, and therefore high-temperature gas, flame, and the like generated in the secondary battery 10 is less likely to reach the other secondary batteries 10. As a result, the other secondary batteries 10 are less likely to be heated, and therefore the temperature of the other secondary batteries 10 is less likely to rise excessively.

In addition, when an abnormality occurs, the partition portion 21 containing the amorphous engineering plastic is heated at a place in contact with the secondary battery 10. As a result, since the temperature of the housing portion 22 rises, when the temperature of the housing portion 22 reaches the melting temperature (melting point) of the amorphous engineering plastic, the thin portion 22T is intentionally melted.

In this case, since the thin portion 22T having a locally thin wall thickness is melted to form the open port 22Q at the place where the thin portion 22T is provided as illustrated in FIG. 9, the heat absorbing agent 30 housed in the housing space 22R is released to the outside from the open port 22Q. As a result, since the heat absorbing agent 30 adheres to the secondary battery 10, the secondary battery 10 is cooled or extinguished while the heat absorbing agent 30 absorbs heat. Therefore, in the secondary battery 10 cooled or extinguished by the heat absorbing agent 30, progress of heat generation or ignition is suppressed.

In a case where the heat absorbing agent 30 is released from the partition plate 20 (housing space 22R) toward the secondary battery 10 at the time of abnormality occurrence, the release direction and the release range of the heat absorbing agent 30 are controlled to be in a predetermined direction and in a predetermined range using the thin portion 22T (open port 22Q). The predetermined direction is a direction in which the heat absorbing agent 30 can be attached to the secondary battery 10, and the predetermined range is a range in which the secondary battery 10 can be cooled using the heat absorbing agent 30. As a result, the secondary battery 10 is quickly and efficiently cooled by the heat absorbing agent 30.

From these, at the time of abnormality occurrence, heat propagation or fire spreading is suppressed using the heat absorbing agent 30, and thus excessive damage of the battery pack is prevented.

Here, the case where the abnormality (heat generation or ignition) occurs in any one of the plurality of secondary batteries 10 has been described. However, in a case where an abnormality occurs in any two or more of the plurality of secondary batteries 10, the above-described operation at the time of abnormality occurrence is still similarly performed for each secondary battery 10 in which the abnormality occurs.

Hereinafter, a manufacturing procedure of the battery pack including six secondary batteries 10 will be described with reference to FIGS. 1 to 8 according to an embodiment.

In the case of manufacturing a battery pack, first, the secondary battery 10 is prepared as illustrated in FIG. 8.

In the case of preparing the secondary battery 10, first, a positive electrode 121 is prepared by forming a positive electrode active material layer on both surfaces of a positive electrode current collector, and a negative electrode 122 is prepared by forming a negative electrode active material layer on both surfaces of a negative electrode current collector. Subsequently, the positive electrode lead 14P is connected to the positive electrode current collector of the positive electrode 121 by a welding method or the like, and the negative electrode lead 14N is connected to the negative electrode current collector of the negative electrode 122 by a welding method or the like.

Subsequently, the positive electrode 121 and the negative electrode 122 are stacked with the separator 123 interposed therebetween, and then the positive electrode 121, the negative electrode 122, and the separator 123 are wound to prepare a wound body (not illustrated) having the winding center space 12K. This wound body has the same configuration as the configuration of the battery element 12 except that each of the positive electrode 121, the negative electrode 122, and the separator 123 is not impregnated with the electrolytic solution. Subsequently, the center pin 15 is inserted into the winding center space 12K.

Subsequently, with the wound body sandwiched between the insulating plates 13A and 13B, the insulating plates 13A and 13B and the wound body are accommodated inside the battery can 11. In this case, the positive electrode lead 14P is connected to the safety valve mechanism 17 by a welding method or the like, and the negative electrode lead 14N is connected to the battery can 11 by a welding method or the like. Subsequently, the electrolytic solution is injected into the battery can 11. As a result, each of the positive electrode 121, the negative electrode 122, and the separator 123 is impregnated with the electrolytic solution, and thus the battery element 12 is prepared.

Finally, the battery cover 16, the safety valve mechanism 17, and the PTC element 18 are accommodated inside the battery can 11, and then the open end portion of the battery can 11 is crimped with the gasket 19 interposed therebetween. As a result, the battery can 11 is sealed by the battery cover 16, and thus the secondary battery 10 is completed.

Further, as illustrated in FIGS. 4 to 6, the partition plate 20 including the partition portion 21 (the housing space 22R and the thin portion 22T) is prepared. The partition plate 20 can be formed by any one or two or more kinds of molding methods such as an injection molding method and an extrusion molding method. Here, the partition plate 20 may be formed by a shaving method other than the molding method.

After the heat absorbing agent 30 is injected into the housing portion 22 (housing space 22R) from the cavity 22K, the cavity 22K is closed using the lid portion 23. As a result, the heat absorbing agent 30 is sealed in the housing space 22R, and thus the partition plate 20 is prepared.

Next, as illustrated in FIG. 3, a battery module 100 is prepared using six secondary batteries 10 and the partition plate 20.

In the case of preparing the battery module 100, first, six secondary batteries 10 are arranged in 3 columns×2 rows. Subsequently, the partition plate 20 is inserted into a gap provided between the six secondary batteries 10, and then the six secondary batteries 10 and the partition plate 20 are inserted into the insertion port 40S provided in the battery holder 40.

Subsequently, by connecting the lead plates 50A to 50D to the six secondary batteries 10, the six secondary batteries 10 are electrically connected to each other in such a manner of being three vertical columns×two horizontal rows by using the lead plates 50A to 50D. Finally, after the control board 60 is arranged on the battery holder 40, each of the lead plates 50A and 50D is connected to the control board 60 by a welding method or the like.

As a result, the six secondary batteries 10 are held by the battery holder 40 while being isolated by the partition plate 20, and the six secondary batteries 10 are electrically connected to each other, and thus the battery module 100 is completed.

Finally, after the battery module 100 is accommodated from the cavity 200K inside the exterior case 200 to which the heat dissipation plate 210 is attached, the cavity 200K is closed using the case lid 300.

Thus, the battery module 100 is sealed inside the exterior case 200, and thus the battery pack is completed.

According to the battery pack, a partition plate 20 containing an amorphous engineering plastic isolates a plurality of secondary batteries 10 from each other, a heat absorbing agent 30 is housed inside a partition plate 20 (housing space 22R), and the partition plate 20 has a thin portion 22T in at least a part of a region where the housing space 22R faces each of the plurality of secondary batteries 10.

In this case, as described above, unlike the case where the partition plate 20 contains a crystalline polymer compound, the partition plate 20 melts in the thin portion 22T at the time of abnormality occurrence (when the secondary battery 10 generates heat or ignites) while the physical strength of the partition plate 20 is secured at the normal time. As a result, since the open port 22Q is formed in the partition plate 20, the heat absorbing agent 30 housed in the housing space 22R is released from the open port 22Q toward the secondary battery 10. Therefore, since the secondary battery 10 is cooled or extinguished by the heat absorbing agent 30, progress of heat generation or ignition is suppressed in the secondary battery 10.

From these, at the time of abnormality occurrence, heat propagation or fire spreading is suppressed using the heat absorbing agent 30, and thus excessive damage of the battery pack is prevented. Therefore, excellent safety can be obtained.

In particular, as long as the amorphous engineering plastic contains one or both of a polycarbonate and a modified polyphenylene ether, the physical strength of the partition plate 20 at the normal time is secured, while the melting property of the partition plate 20 at the time of abnormality occurrence is also secured, and thus a more excellent effect can be obtained.

Further, in the region where the thin portion 22T is provided, as long as the partition plate 20 has the recess V inside communicating with the housing space 22R, the housing amount of the heat absorbing agent 30 increases and the thin portion 22T is more likely to be melted, and thus a more excellent effect can be obtained.

In this case, as long as the opening width W of the recess V gradually decreases toward an outer side of the partition plate 20, when the partition plate 20 is subjected to vibration, impact, or the like, stress concentration is still alleviated in the thin portion 22T, and therefore the thin portion 22T is less likely to be cleaved. Therefore, since the heat absorbing agent 30 is hardly released at the normal time, a more excellent effect can be obtained.

In addition, as long as each of the plurality of secondary batteries 10 extends in the length direction L, and the thin portion 22T also extends in the length direction L, the release range of the heat absorbing agent 30 released toward the secondary batteries 10 increases, and thus a more excellent effect can be obtained.

In addition, as long as the heat absorbing agent 30 contains water, excellent fluidity and excellent cooling property can be obtained for the heat absorbing agent 30, and thus a more excellent effect can be obtained. In this case, as long as the heat absorbing agent 30 is in a gel state in which water is held by the polymer compound, the viscosity of the heat absorbing agent 30 increases, and thus a more excellent effect can be obtained. As long as the polymer compound contains sodium polyacrylate, high water retentivity and high adhesiveness can be obtained in the heat absorbing agent 30, and thus a more excellent effect can be obtained.

As long as the battery pack includes the plurality of secondary batteries 10, when charging and discharging are repeated in the battery pack, excessive damage due to heat propagation or fire spreading between the plurality of secondary batteries 10 is still effectively prevented, and thus a more excellent effect can be obtained.

In addition, according to the battery pack, the partition plate 20 isolates the plurality of secondary batteries 10 from each other, the heat absorbing agent 30 is housed inside the partition plate 20, and the isolating member has the melting portion (thin portion 22T), and when the secondary batteries 10 generate heat or ignite, the partition plate 20 locally melts in the melting portion and releases the heat absorbing agent 30 toward the secondary batteries 10. As a result, as described above, at the time of abnormality occurrence, heat propagation or fire spreading is suppressed using the heat absorbing agent 30, and thus excessive damage of the battery pack is prevented. Therefore, excellent safety can be obtained.

The configuration of the battery pack described herein can be changed as appropriate. Any two or more of a series of modification examples described may be combined with each other.

The configuration of the partition portion 21 illustrated in FIG. 4 can be arbitrarily changed as long as the heat absorbing agent 30 can be released to the outside from the open port 22Q using the melting of the partition plate 20 (thin portion 22T) at the time of abnormality occurrence.

For example, in FIG. 4, the partition portion 21 has four thin portions 22T, and the number of thin portions 22T may be three or less.

In FIG. 4, the recess V is provided inside the housing portion 22 for forming the thin portion 22T, and the recess V may be provided outside the housing portion 22.

Further, in FIG. 4, one thin portion 22T is provided in a region where the partition portion 21 faces one support surface 22M, and the number of thin portions 22T may be two or more.

In these cases, since damage of the battery pack is prevented using the heat absorbing agent 30, excellent safety can still be obtained.

Here, in order to still efficiently prevent damage of the battery pack using the heat absorbing agent 30 when any of the four secondary batteries 10 supported by the partition portion 21 generates heat or ignites, the partition portion 21 preferably has four thin portions 22T.

In addition, in order to effectively prevent damage of the battery pack using the heat absorbing agent 30 by increasing the housing amount of the heat absorbing agent 30 housed in the housing space 22R, the recess V is preferably provided inside the housing portion 22.

Furthermore, in order to prevent the physical strength of the housing portion 22 from being excessively lowered, the number of thin portions 22T provided in the housing portion 22 in the region corresponding to one support surface 22M is preferably not excessively large.

Figure 10:
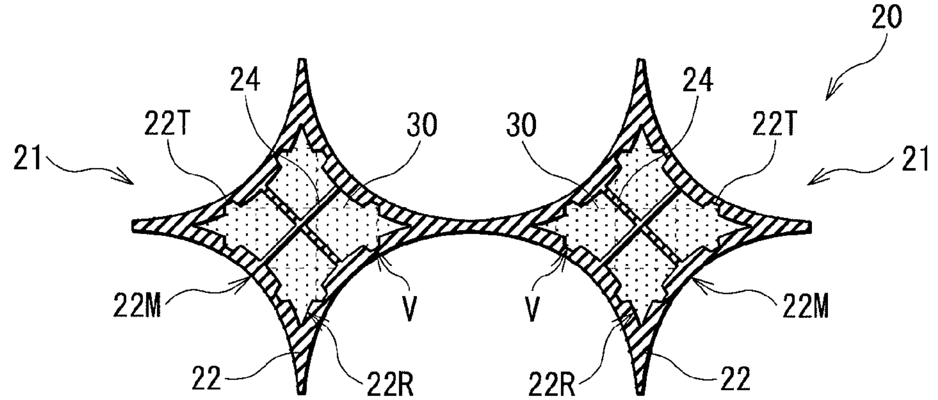
FIG. 10 is a sectional view illustrating a configuration of a battery pack (partition plate) according to an embodiment.

As illustrated in FIG. 10 corresponding to FIG. 4, the partition portion 21 of the partition plate 20 may further include a beam portion 24 inside the housing portion 22.

The beam portion 24 is a substantially plate-like member that divides the housing space 22R into a plurality of portions, and the beam portion 24 is coupled to the housing portion 22. The number of beam portions 24 is not particularly limited, and can be arbitrarily set according to the number of divisions of the housing space 22R.

The reason why the partition portion 21 includes the beam portion 24 inside the housing portion 22 is that the physical strength of the partition portion 21 is improved as compared with the case where the partition portion 21 does not include the beam portion 24 inside the housing portion 22. As a result, when the housing portion 22 has the housing space 22R inside, physical durability of the partition portion 21 against external force is improved.

Here, the partition portion 21 includes four beam portions 24. One end portion of each of the four beam portions 24 is coupled to the housing portion 22, and the other end portion of each of the four beam portions 24 is coupled to each other. As a result, the housing space 22R is divided into four by the four beam portions 24.

In this case, it is preferable that the housing portion 22 has a thin portion 22T for each of the four divided housing spaces 22R. This is because, since the number of the open ports 22Q formed at the time of abnormality occurrence increases, the heat absorbing agent 30 housed in the housing space 22R is more likely to be released to the outside from the open port 22Q.

In this case, since damage of the battery pack is prevented using the heat absorbing agent 30, excellent safety can still be obtained. In this case, in particular, as described above, the physical durability of the partition portion 21 is improved using the beam portion 24.

Therefore, at the time of abnormality occurrence, the heat absorbing agent 30 is more likely to be and stably released to the outside from the open port 22Q, and thus a more excellent effect can be obtained.

Figure 11:
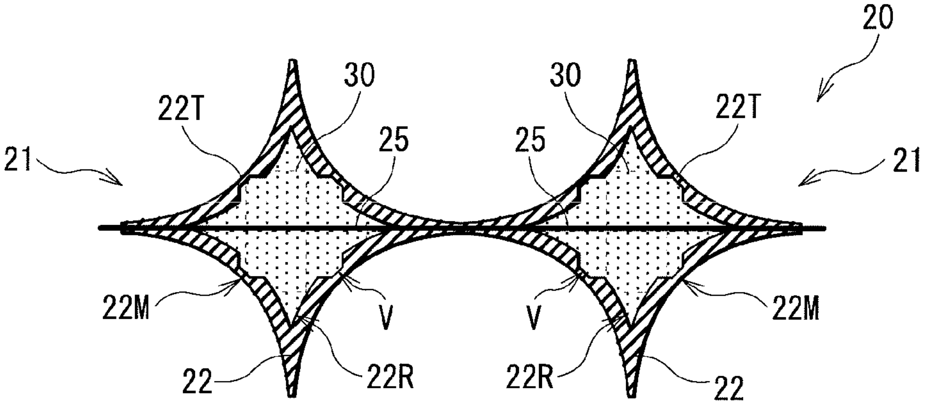
FIG. 11 is a sectional view illustrating a configuration of a battery pack (partition plate) according to an embodiment.

As illustrated in FIG. 11 corresponding to FIG. 4, the partition portion 21 of the partition plate 20 may further include a heat conduction part 25 inside the housing portion 22.

The heat conduction part 25 is a substantially plate-like member that divides the housing space 22R into a plurality of portions and is partly exposed to the outside of the housing portion 22. Here, each of one end portion and the other end portion of the heat conduction part 25 is exposed to the outside of the housing portion 22. Here, in FIG. 11, the heat conduction part 25 is illustrated in a linear shape in order to simplify the illustration. The number of heat conduction parts 25 is not particularly limited, and can be arbitrarily set.

In addition, the heat conduction part 25 includes any one or two or more kinds of metal materials. This is because high thermal conductivity can be obtained. The kind of the metal material is not particularly limited, and specific examples thereof include copper, aluminum, a copper alloy, and an aluminum alloy.

The partition plate 20 including the heat conduction part 25 can be formed by an insert molding method or the like.

The partition portion 21 includes the heat conduction part 25 because heat is dissipated by the heat conduction part 25 unlike the case where the partition portion 21 does not include the heat conduction part 25. In this case, when heat is generated at the time of abnormality occurrence, the heat is guided to each of the one end portion and the other end portion of the heat conduction part 25, and thus the heat is released to the outside from each of the one end portion and the other end portion of the heat conduction part 25 exposed to the outside of the housing portion 22.

In particular, in a case where the heat absorbing agent 30 contains water, since the water has a high heat accumulation property, a so-called heat retention phenomenon is likely to occur in the heat absorbing agent 30. However, by using the heat conduction part 25, heat accumulated inside the partition portion 21 due to the heat retention phenomenon is more likely to be dissipated.

Here, since the partition portion 21 includes one heat conduction part 25, the housing space 22R is divided into two by the one heat conduction part 25.

Here, since the partition plate 20 includes two partition portions 21 coupled to each other as described above, the partition plate has two housing spaces 22R separated from each other. In this case, it is preferable that the heat conduction part 25 is arranged inside each of the two housing spaces 22R, and the two heat conduction parts 25 are coupled to each other. This is because when the two partition portions 21 are coupled to each other, heat is still more likely to be dissipated using the two heat conduction parts 25 coupled to each other.

In this case, since damage of the battery pack is prevented using the heat absorbing agent 30, excellent safety can still be obtained. In this case, in particular, as described above, heat is more likely to be dissipated using the heat conduction part 25, and thus a more excellent effect can be obtained. In addition, as long as the plurality of heat conduction parts 25 are coupled to each other, heat is further more likely to be dissipated using the plurality of heat conduction parts 25, and thus a further more excellent effect can be obtained.

In FIG. 11, one end portion and the other end portion of the heat conduction part 25 are exposed to the outside of the housing portion 22. However, one or both of the one end portion and the other end portion of the heat conduction part 25 may not be exposed to the outside of the housing portion 22. Also in this case, since heat is guided and dissipated using the heat conduction part 25, a similar effect can be obtained.

In particular, in a case where the one end portion of the heat conduction part 25 is not exposed to the outside of the housing portion 22, the heat dissipation efficiency can be improved by reducing the thickness of the housing portion 22 at a place facing the one end portion of the heat conduction part 25. The advantages described here can still be similarly obtained when the other end portion of the heat conduction part 25 is not exposed to the outside of the housing portion 22.

Figure 12:
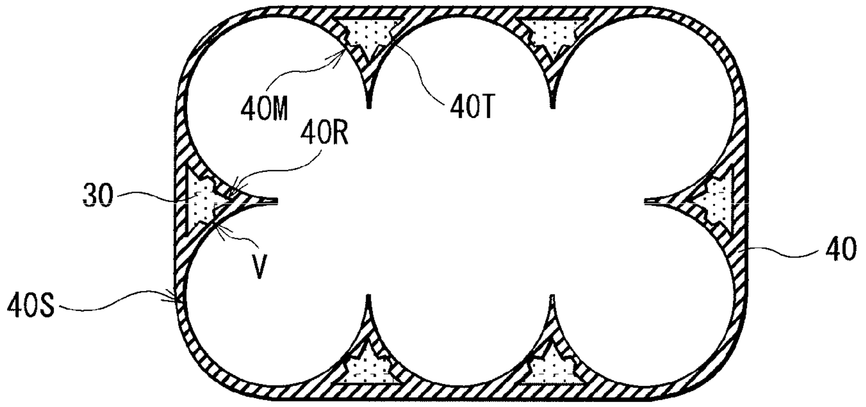
FIG. 12 is a sectional view illustrating a configuration of a battery pack (battery holder) according to an embodiment.

As illustrated in FIG. 12 corresponding to FIG. 7, the heat absorbing agent 30 may be further housed inside the battery holder 40. FIG. 12 illustrates a sectional configuration corresponding to the perspective configuration of the battery holder 40 illustrated in FIG. 7.

Specifically, the battery holder 40 has a housing space 40R inside. The housing space 40R is a second housing space in which the heat absorbing agent 30 is housed, and extends in the length direction L.

Details regarding the heat absorbing agent 30 are as described above. Here, the kind of the heat absorbing agent 30 housed in the housing space 20R of the partition plate 20 and the kind of the heat absorbing agent 30 housed in the housing space 40R of the battery holder 40 may be the same or different from each other.

The battery holder 40 has six holding surfaces 40M that can contact six secondary batteries 10 in order to hold the six secondary batteries 10. Here, the holding surface 40M is a concave curved surface.

Since the wall thickness of the battery holder 40, that is, the wall thickness of the side wall defining the housing space 40R in the battery holder 40 is not constant over the entire area and is locally thin, the battery holder 40 has a thin portion 40T having a locally thin wall thickness. Since the thin portion 40T is the second thin portion provided in at least a part of the region where the housing space 40R faces the secondary battery 10, the battery holder 40 has the thin portion 40T in at least a part of the region where the housing space 40R faces the secondary battery 10.

The aspect in which the thin portion 40T is provided in the battery holder 40 is not particularly limited, and is specifically similar to the aspect in which the thin portion 22T is provided in the partition plate 20. Here, since the recess V is provided inside the battery holder 40, the thin portion 40T is formed using the recess V. The thin portion 40T extends in the length direction L.

The number of each of the housing space 40R and the thin portion 40T is not particularly limited, and can be arbitrarily set. In addition, the installation place of the housing space 40R is not particularly limited, and can be arbitrarily set.

Here, the battery holder 40 has six housing spaces 40R, and two thin portions 40T are provided in the battery holder 40 for each housing space 40R. The two thin portions 40T are arranged at places facing different insertion ports 40S from each other. In addition, the housing space 40R is provided in all places (6 places) having a space in which the housing space 40R can be installed.

In this case, the battery holder 40 contains any one or two or more kinds of amorphous engineering plastics. Details regarding the amorphous engineering plastic are as described herein.

Although not specifically illustrated herein, the aspect in which the heat absorbing agent 30 is housed inside the housing space 40R provided in the battery holder 40 is not particularly limited, and can be arbitrarily set.

For example, similarly to the configuration of the partition plate 20 illustrated in FIGS. 5 and 6, a part of the battery holder 40 may have a vessel-like shape having a housing space 40R capable of housing the heat absorbing agent 30, and the vessel-like battery holder 40 may be sealed by a lid member (not illustrated) in a state where the heat absorbing agent is housed inside the housing space 40R.

In this case, the battery holder 40 operates at the time of abnormality occurrence, similarly to the operation at the time of abnormality occurrence related to the partition plate 20 described above. That is, when the secondary battery 10 generates heat or ignites, the battery holder 40 melts in the thin portion 40T, and thus an open port (not illustrated) is formed in the battery holder 40. As a result, the heat absorbing agent 30 housed in the housing space 40R is released from the open port toward the secondary battery 10, and thus the secondary battery 10 is cooled or extinguished by the heat absorbing agent 30.

In this case, since damage of the battery pack is prevented using the heat absorbing agent 30, excellent safety can still be obtained. In this case, in particular, as described above, since not only the heat absorbing agent 30 is released to the outside from the housing space 22R, but also the heat absorbing agent 30 is released to the outside from the housing space 40R, the cooling efficiency of the secondary battery 10 is improved. Therefore, damage to the battery pack is further prevented, and thus a more excellent effect can be obtained.

The melting portion provided in the housing portion 22 is the thin portion 22T. Therefore, the melting portion has a thickness thinner than the thickness of the portion other than the melting portion so as to be preferentially melted than the portion other than the melting portion.

However, the configuration of the melting portion is not particularly limited as long as the melting portion can be melted preferentially than the portion other than the melting portion. For example, the melting portion may contain a material that is further more likely to be melted than the portion other than the melting portion, that is, a material having a melting point lower than the melting point of the portion other than the melting portion.

Also in this case, the housing portion 22 can be locally melted in the melting portion, and the housing portion 22 can release the heat absorbing agent 30 to the outside. Therefore, since damage of the battery pack is prevented using the heat absorbing agent 30, excellent safety can be obtained.

The application of the battery pack is not particularly limited, as long as the battery pack is applied to machines, devices, instruments, apparatuses, systems, and the like (assembly of a plurality of devices or the like) that can use the battery pack as a driving power supply, a power storage source for reserve of power, and the like. The battery pack for use as a power supply may be served as a main power supply or an auxiliary power supply. The main power supply is a power supply that is used preferentially, regardless of the presence or absence of other power supplies. The auxiliary power supply may be, for example, a power supply which is used instead of the main power supply, or a power supply which is switched from the main power supply as necessary. When the battery pack is used as an auxiliary power supply, the main power supply is not limited to the battery pack.

Examples of the application of the battery pack are as follows. The battery pack can be applied to electronic devices (including portable electronic devices) such as video cameras, digital still cameras, mobile phones, notebook personal computers, cordless phones, headphone stereos, portable radios, portable TVs, and portable information terminals. The battery pack can be applied to portable household appliances such as electric shavers. The battery pack can be applied to storage devices such as backup power supplies and memory cards. The battery pack can be applied to power tools such as electric drills and electric saws. The battery pack can be applied to medical electronic devices such as pacemakers and hearing aids. The battery pack can be applied to electric vehicles such as electric cars (including hybrid cars). The battery pack can be applied to power storage systems such as domestic battery systems that store electric power in preparation for emergency or the like. Of course, the application of the battery pack may be an application other than the above.

The present technology has been described herein with reference to one or more embodiments; however, the present technology is not limited thereto, and various modifications may be made to the present technology.

For example, the case where the battery structure of the secondary battery is cylindrical has been described, for example; however, the battery structure of the secondary battery applied to the battery pack of the present technology is not particularly limited. Specifically, the battery structure of the secondary battery may be a rectangular type, a coin type, or the like.

In addition, the case where the secondary battery has the wound structure has been described, but the structure of the secondary battery is not particularly limited. Specifically, the secondary battery may have another structure such as a laminated structure.

Further, lithium has been used as an electrode reactant of the secondary battery, but the kind of the electrode reactant is not particularly limited. Specifically, the electrode reactant may be another element of Group 1 in the long-periodic table such as sodium or potassium, an element of Group 2 in the long-periodic table such as magnesium or calcium or another light metal such as aluminum.

Note that the effects described in the present description are merely examples and are not limited thereto, and other effects may be provided.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
- a plurality of batteries;
- an isolating member that is arranged between the plurality of batteries and isolates the plurality of batteries from each other; and
- a heat absorbing agent that is housed inside the isolating member, wherein
- the isolating member has a first housing space for housing the heat absorbing agent and contains an amorphous engineering plastic, and
- the isolating member has a first thin portion having a locally thin wall thickness in at least a part of a region where the first housing space faces each of the plurality of batteries.

2. The battery pack according to claim 1, wherein the amorphous engineering plastic includes one or both of a polycarbonate and a modified polyphenylene ether.

3. The battery pack according to claim 1, wherein the isolating member has a recess inside communicating with the first housing space in a region where the first thin portion is provided.

4. The battery pack according to claim 3, wherein an opening width of the recess gradually decreases toward an outer side of the isolating member.

5. The battery pack according to claim 1, wherein
- each of the plurality of batteries extends in a length direction, and
- the first thin portion extends in the length direction.

6. The battery pack according to claim 1, wherein the heat absorbing agent includes water.

7. The battery pack according to claim 6, wherein
- the heat absorbing agent further includes a polymer compound, and
- the heat absorbing agent has a gel state in which the water is retained by the polymer compound.

8. The battery pack according to claim 7, wherein the polymer compound includes sodium polyacrylate.

9. The battery pack according to claim 1, wherein the isolating member includes, inside the first housing space, a beam portion that divides the first housing space into a plurality of portions.

10. The battery pack according to claim 1, wherein
- the isolating member includes, inside the first housing space, a heat conduction part that divides the first housing space into a plurality of portions and is partly exposed to an outside of the isolating member, and
- the heat conduction part includes a metal material.

11. The battery pack according to claim 10, wherein
- the isolating member has a plurality of the first housing spaces separated from each other,
- the heat conduction part is arranged inside each of the plurality of the first housing spaces, and
- a plurality of the heat conduction parts are coupled to each other.

12. The battery pack according to claim 1 further comprising a holding member that is arranged around the plurality of batteries and holds the plurality of batteries isolated from each other by the isolating member, wherein
- the heat absorbing agent is further housed inside the holding member,
- the holding member has a second housing space for housing the heat absorbing agent and contains an amorphous engineering plastic, and
- the holding member has a second thin portion locally having a thin wall thickness in at least a part of a region where the second housing space faces each of the plurality of batteries.

13. The battery pack according to claim 1, wherein each of the batteries is a secondary battery.

14. The battery pack according to claim 1, wherein the first thin portion is a melting point, and, when at least one of the plurality of batteries generates heat or ignites, the isolating member locally melts at the melting portion to release the heat absorbing agent toward the at least one of the plurality of batteries.

* * * * *